US008255220B2

(12) United States Patent
Cho et al.

(10) Patent No.: US 8,255,220 B2
(45) Date of Patent: Aug. 28, 2012

(54) DEVICE, METHOD, AND MEDIUM FOR ESTABLISHING LANGUAGE MODEL FOR EXPANDING FINITE STATE GRAMMAR USING A GENERAL GRAMMAR DATABASE

(75) Inventors: Jeong-mi Cho, Suwon-si (KR); Byung-kwan Kwak, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 643 days.

(21) Appl. No.: 11/545,484

(22) Filed: Oct. 11, 2006

(65) Prior Publication Data

US 2007/0118353 A1    May 24, 2007

(30) Foreign Application Priority Data

Nov. 18, 2005   (KR) .................. 10-2005-0110934

(51) Int. Cl.
*G10L 15/00* (2006.01)
*G10L 15/18* (2006.01)
(52) U.S. Cl. .......................... 704/257; 704/9
(58) Field of Classification Search ............... 704/1–10, 704/257
See application file for complete search history.

(56) References Cited

U.S. PATENT DOCUMENTS

| | | | | |
|---|---|---|---|---|
| 5,806,032 A | * | 9/1998 | Sproat ........................ | 704/255 |
| 6,424,983 B1 | * | 7/2002 | Schabes et al. ............ | 715/257 |
| 7,289,950 B2 | * | 10/2007 | Bellegarda et al. ........ | 704/10 |
| 2003/0120480 A1 | * | 6/2003 | Mohri et al. ................ | 704/4 |
| 2004/0176945 A1 | | 9/2004 | Inagaki et al. | |

FOREIGN PATENT DOCUMENTS

| | | |
|---|---|---|
| JP | 2004-271764 | 9/2004 |
| KR | 2001-0087328 | 9/2001 |
| KR | 10-2005-0101694 | 10/2005 |
| KR | 10-2005-0101695 | 10/2005 |

OTHER PUBLICATIONS

-Koskenniemi, K.; Tapanainen, P.; Voutilainen, A. "Compiling and Using Finite-State Syntactic Rules" Proceedings of the 14th Conference on Computational Linguistics. Association for Computational Linguistics, 1992.*
Korean Office Action issued Nov. 9, 2006 in Korean Patent Application No. 10-2005-0110934.
Korean Notice of Allowance dated May 25, 2007, issued in corresponding Korean Patent Application No. 10-2005-0110934.

* cited by examiner

*Primary Examiner* — Talivaldis Ivars Smits
*Assistant Examiner* — Shaun Roberts
(74) *Attorney, Agent, or Firm* — Staas & Halsey LLP

(57) ABSTRACT

A device, a method, and a medium for establishing a language model for speech recognition are disclosed. The language-model-establishing device includes: a schema expander for expanding a state schema which is composed of at least one state defined by a finite state grammar using a general grammar database; a grammatical-structure-expander for expanding grammatical structures which can be expressed by each state of the expanded state schema using the general grammar database; and a grammatical-structure-filter for filtering out any incorrect grammatical structure from the expanded grammatical structures using the general grammar database. Since the state schema is expanded using the general grammar database, it is possible to improve recognition of unlearned grammatical structures.

25 Claims, 13 Drawing Sheets

FIG. 5B
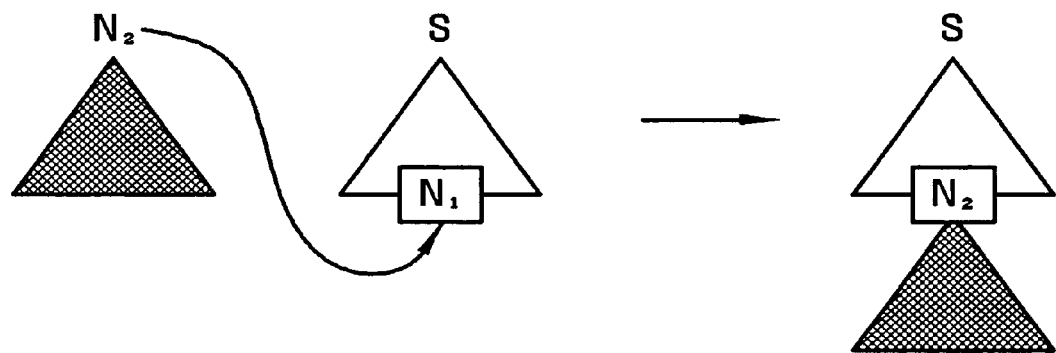
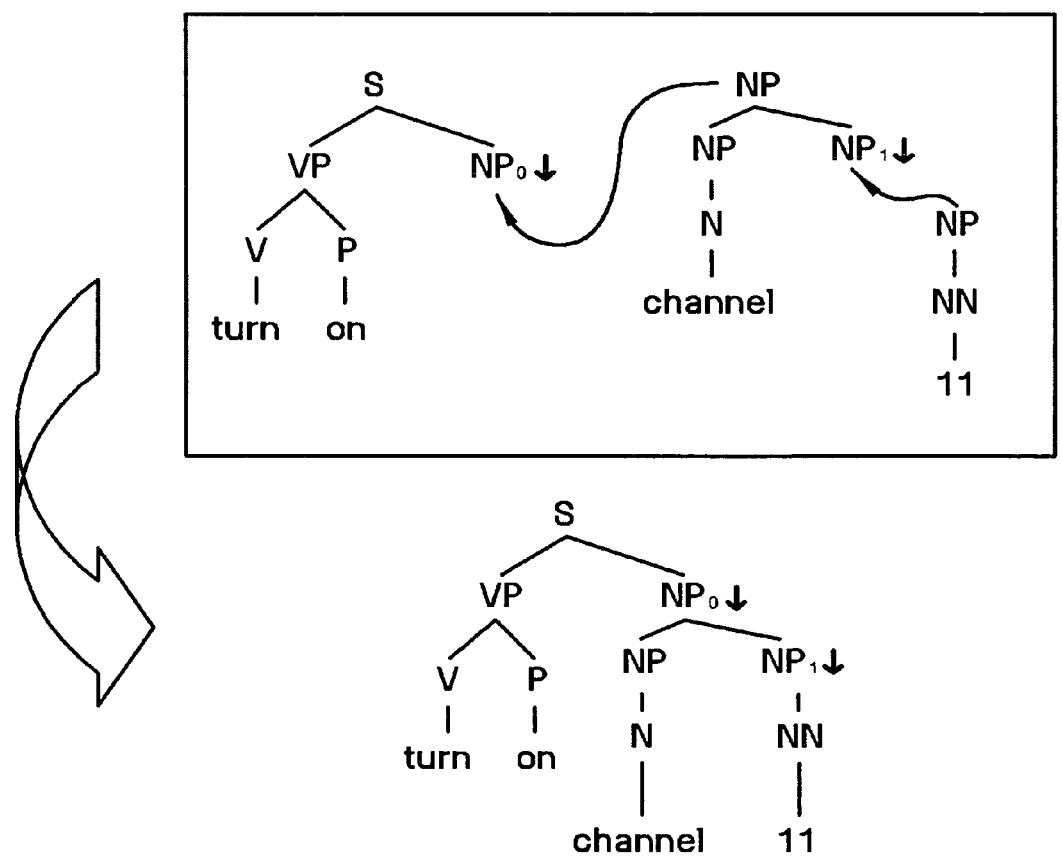

FIG. 5C
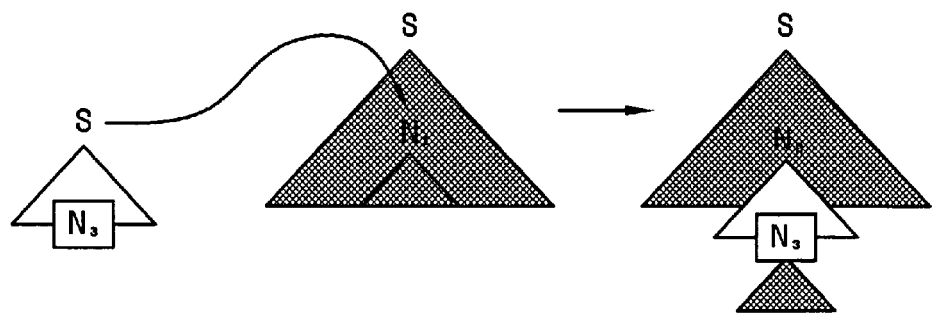
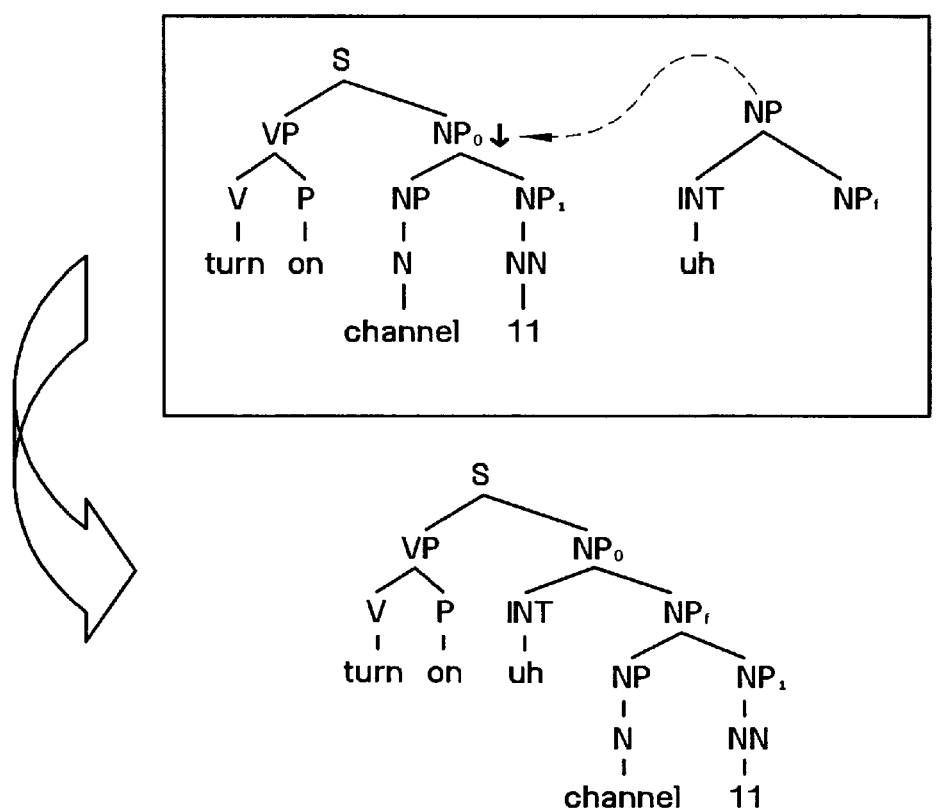

FIG. 6B
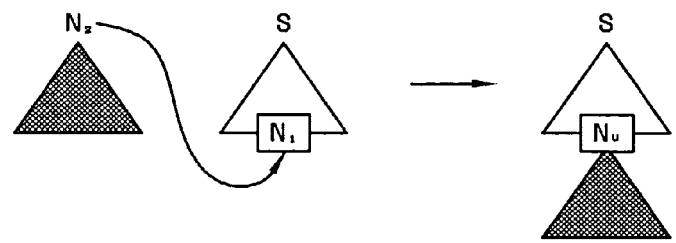
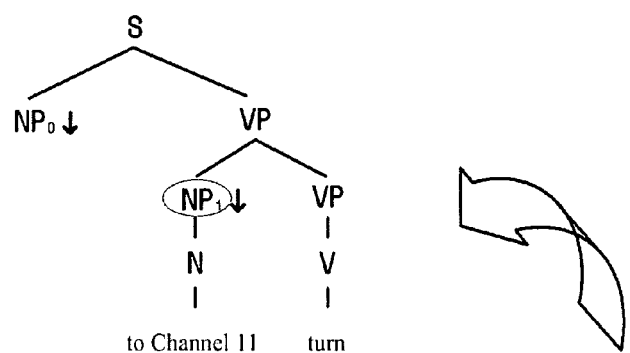
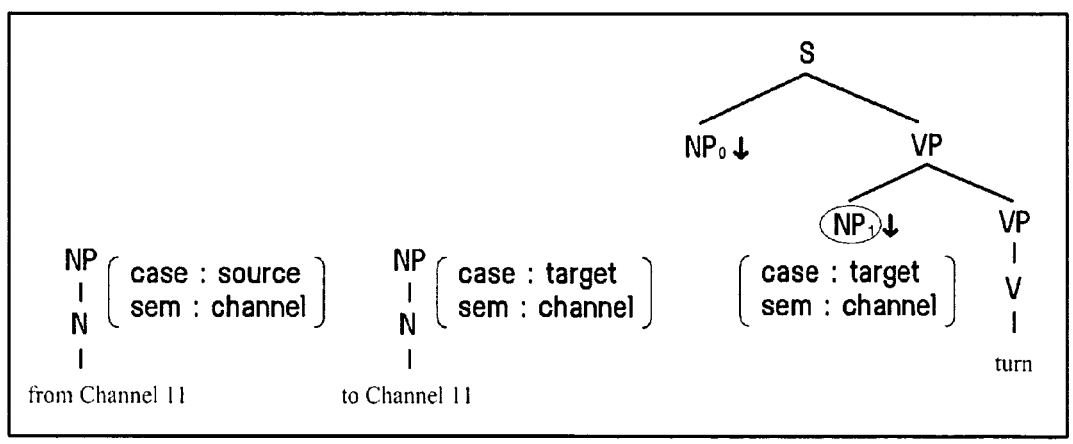

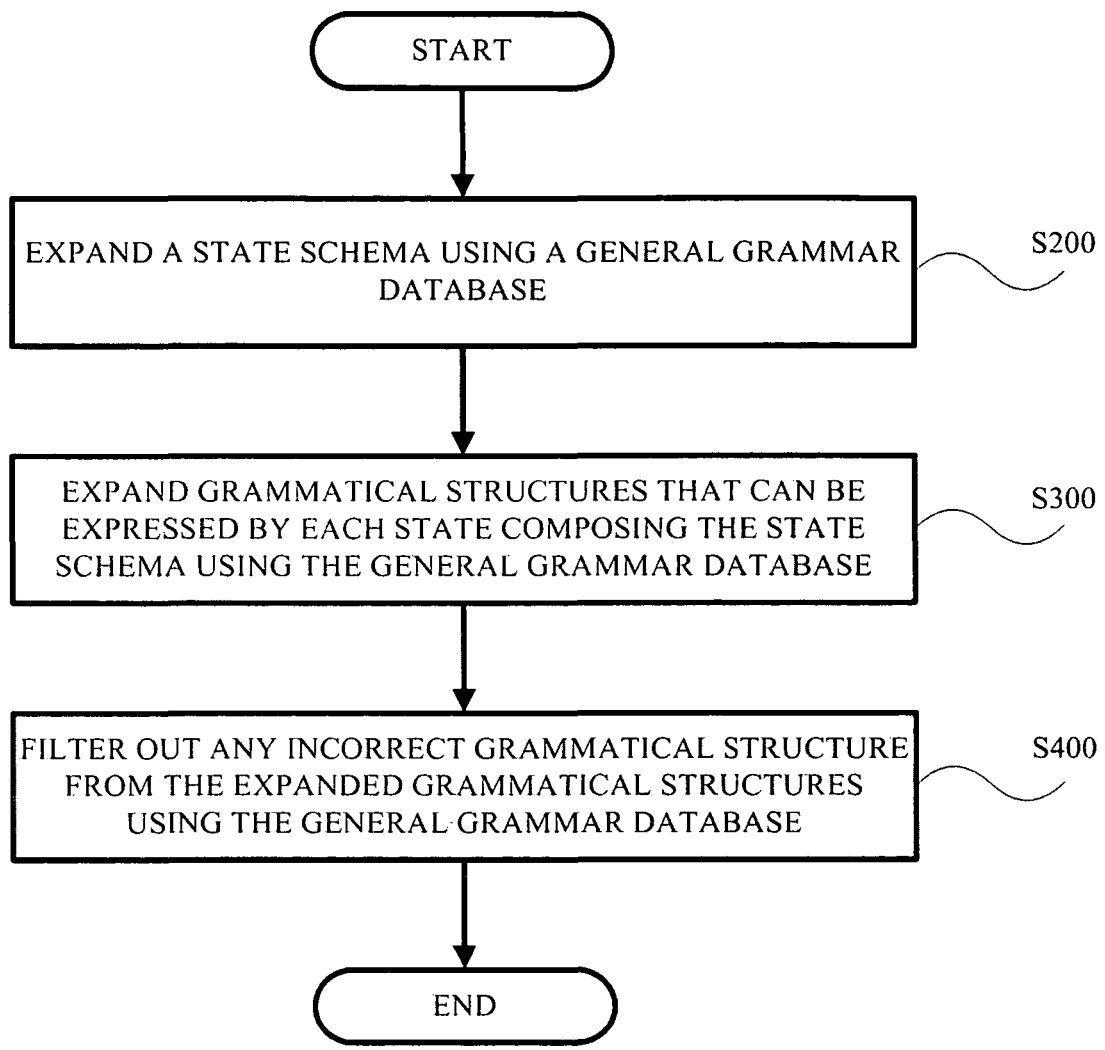

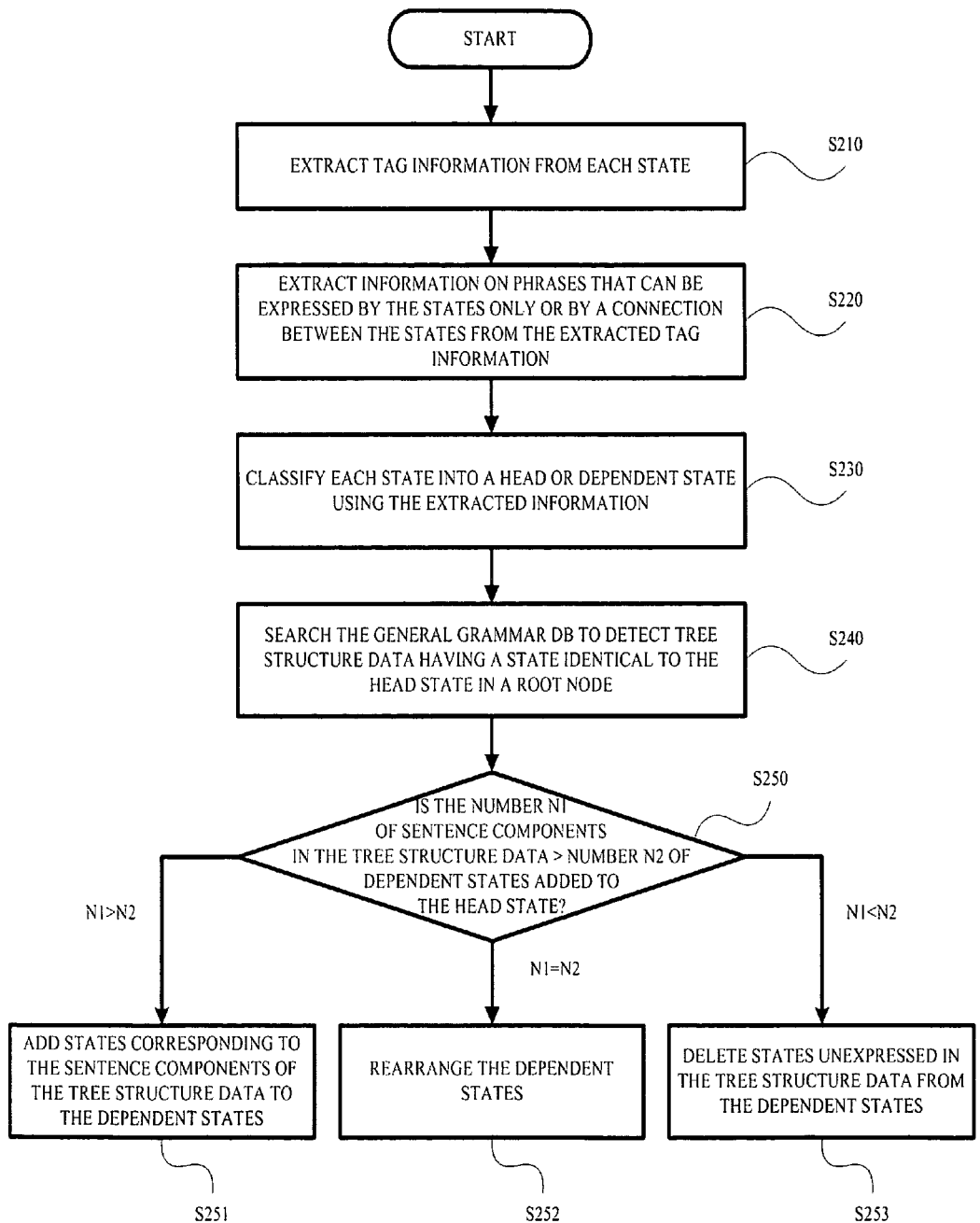

DEVICE, METHOD, AND MEDIUM FOR ESTABLISHING LANGUAGE MODEL FOR EXPANDING FINITE STATE GRAMMAR USING A GENERAL GRAMMAR DATABASE

CROSS-REFERENCE TO RELATED APPLICATIONS

This application claims the benefit of Korean Patent Application No. 10-2005-0110934 filed on Nov. 18, 2005 in the Korean Intellectual Property Office, the disclosure of which is incorporated herein by reference in its entirety.

BACKGROUND OF THE INVENTION

1. Field of the Invention

The present invention relates to a device, method, and medium for establishing a language model for speech recognition, and more particularly to a device, method, and medium for establishing a language model that can expand a state schema defined by a finite state grammar using a general grammar database and thereby improve recognition of unlearned grammatical structures.

2. Description of the Related Art

Speech recognition is a technique for recognizing or identifying a human voice by a mechanical (computer) analysis. Human speech has peculiar frequencies that depend on the shape of the mouth and the position of the tongue, which change according to the pronunciation. Human speech can be recognized by converting speech to an electrical signal, and extracting a frequency characteristic of the speech signal. The speech recognition technology is now used in a wide range of applications such as dialing, control of toys, language learning devices, and home appliances.

Generally, a continuous speech recognition device is configured as illustrated in FIG. 1. Referring to FIG. 1, a conventional continuous speech recognition device includes: a feature extraction unit 10 that extracts only information useful for speech recognition from a speech pattern received by the speech recognition device in order to convert the speech pattern into a feature vector; and a search unit 20 finding the most likely sequence of words from the feature vector using a Viterbi algorithm by reference to an acoustic model database 40, a pronunciation dictionary database 50 and a language model database 60 that were produced previously during a learning process. In word recognition, words to be recognized are arranged in a tree structure. The search unit 10 searches the tree to find the most likely sequence of words. A post-processing unit 30 removes pronunciation symbols and tags from the found word sequence and collects phonemes forming a syllable to provide text as the final speech recognition results. Available speech feature extraction methods include linear prediction coefficients (LPC) Cepstrum, perceptual linear prediction PLP Cepstrum, MFCC (Mel Frequency Cepstral Coefficient) and the filter bank energy technique.

As explained above, the conventional speech recognition device uses the acoustic model database 40, pronunciation dictionary database 50 and language model database 60 for the speech recognition. The language model database 60 includes occurrence frequency data of words established in a learning text database and occurrence probability data which can be bigram or trigram probabilities calculated using the occurrence frequency data. In other words, the occurrence probability data shows the probability of a target word that may occur after a preceding sequence of words. Language models estimate the occurrence probability of a word following a preceding sequence of words in the text. The bigram probability is the probability of a target word given one preceding word. The trigram probability is the probability of a word given two preceding words. Generally, language models using n−1 previous words in a sequence to predict the next word are called n-gram models. The greater "n" is, the more information the n-gram language models offer. However, greater n-gram language models take up more memory and require more time to find the next word.

Speech recognizers using an n-gram language model have a relatively high degree of freedom because they can even recognize sentences that were not previously learned. The speech recognizers using the n-gram language model, however, have recognition-error problems. By contrast, speech recognizers using a finite state transducer ("FST") establish various sets of previously learned sentences as data. Although the speech recognizers using an FST have lower recognition error rates for the established sentences, they cannot recognize sentences that were not previously learned. In other words, the speech recognizers using an FST have a low degree of freedom. Improvements combining the two speech recognition methods (i.e., applying an FST within a range of application of an n-gram language model) have been proposed. Even the improved speech recognition methods, however, have the drawbacks of the FST technique, and cannot meet the demand for both high degree of freedom and high recognition rates in the recognition of various non-grammatical sentences which are common in conversational speech.

SUMMARY OF THE INVENTION

Additional aspects, features, and/or advantages of the invention will be set forth in part in the description which follows and, in part, will be apparent from the description, or may be learned by practice of the invention.

The present invention solves the above-mentioned problems occurring in the prior art, and the present invention provides a device method, and medium for establishing a language model which can expand a state schema defined by a finite state grammar using a general grammar database and thereby improve recognition of unlearned grammatical structures.

The present invention is not limited to that stated above. Those of ordinary skill in the art will clearly recognize additional aspects, features, and advantages in view of the following description of the present invention.

In an aspect of the present invention, there is provided a device for establishing a language model, which includes: a schema-expander for expanding a state schema which is composed of at least one state defined by a finite state grammar using a general grammar database; a grammatical-structure-expander for expanding grammatical structures which can be expressed by each state of the expanded state schema using the general grammar database; and a grammatical-structure-filter for filtering out any incorrect grammatical structure from the expanded grammatical structures using the general grammar database.

In another aspect of the present invention, there is provided a method of establishing a language model, including: expanding a state schema which is composed of at least one state defined by a finite state grammar using a general grammar database; expanding grammatical structures which can be expressed by each state of the expanded state schema using the general grammar database; and filtering out any incorrect grammatical structure from the expanded grammatical structures using the general grammar database.

In another aspect of the present invention, there is provided at least one computer readable medium storing instructions that control at least one processor to perform a method including: expanding a state schema which is composed of at least one state defined by a finite state grammar using a general grammar database; expanding grammatical structures which can be expressed by each state of the expanded state schema using the general grammar database; and filtering out any incorrect grammatical structure from the expanded grammatical structures using the general grammar database.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 5B is a view showing substitution performed by the grammatical-structure-expanding unit of FIG. 5A;

FIG. 5C is a view showing adjunction performed by the grammatical-structure-expanding unit of FIG. 5A;

FIG. 6B is a view showing a filtering process performed in the grammatical-structure-filtering unit in FIG. 6A;

FIG. 7 is a flowchart showing a process of establishing a language model according to an exemplary embodiment of the present invention;

FIG. 8A is a flowchart showing sub-steps of expanding a state schema in the process of FIG. 7;

DETAILED DESCRIPTION OF THE PREFERRED EMBODIMENTS

Figure 1:
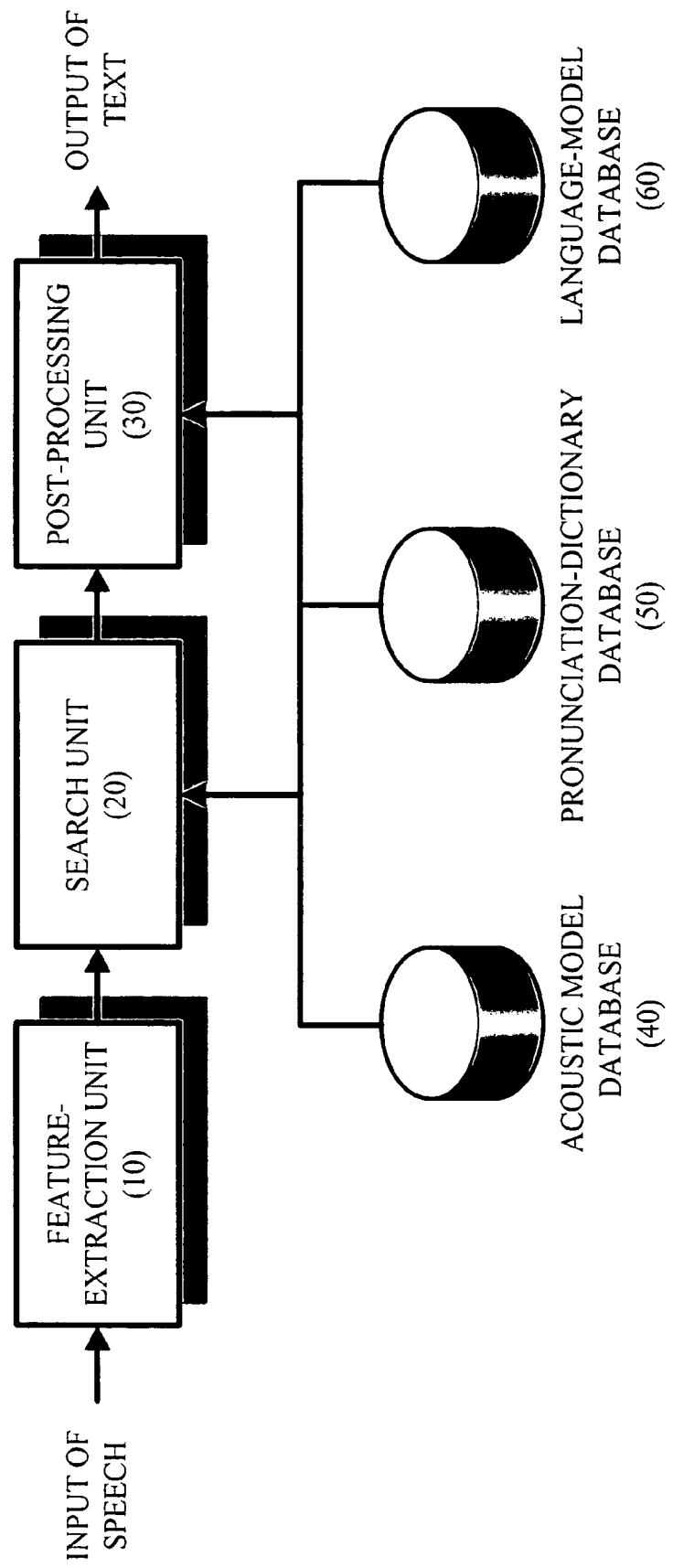
FIG. 1 is a view showing the structure of a conventional continuous speech recognition device of the prior art.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

The matters exemplified in this description are provided to assist in a comprehensive understanding of various exemplary embodiments of the present invention. Accordingly, those of ordinary skill in the art will recognize that various changes and modifications of exemplary embodiments described herein can be made without departing from the scope and spirit of the claimed invention. Descriptions of well-known functions and constructions are omitted for clarity and conciseness.

The device, method, and medium for establishing a language model according to an exemplary embodiment of the present invention will be explained in detail with reference to the block diagrams and flowcharts in the accompanying drawings.

Figure 2:
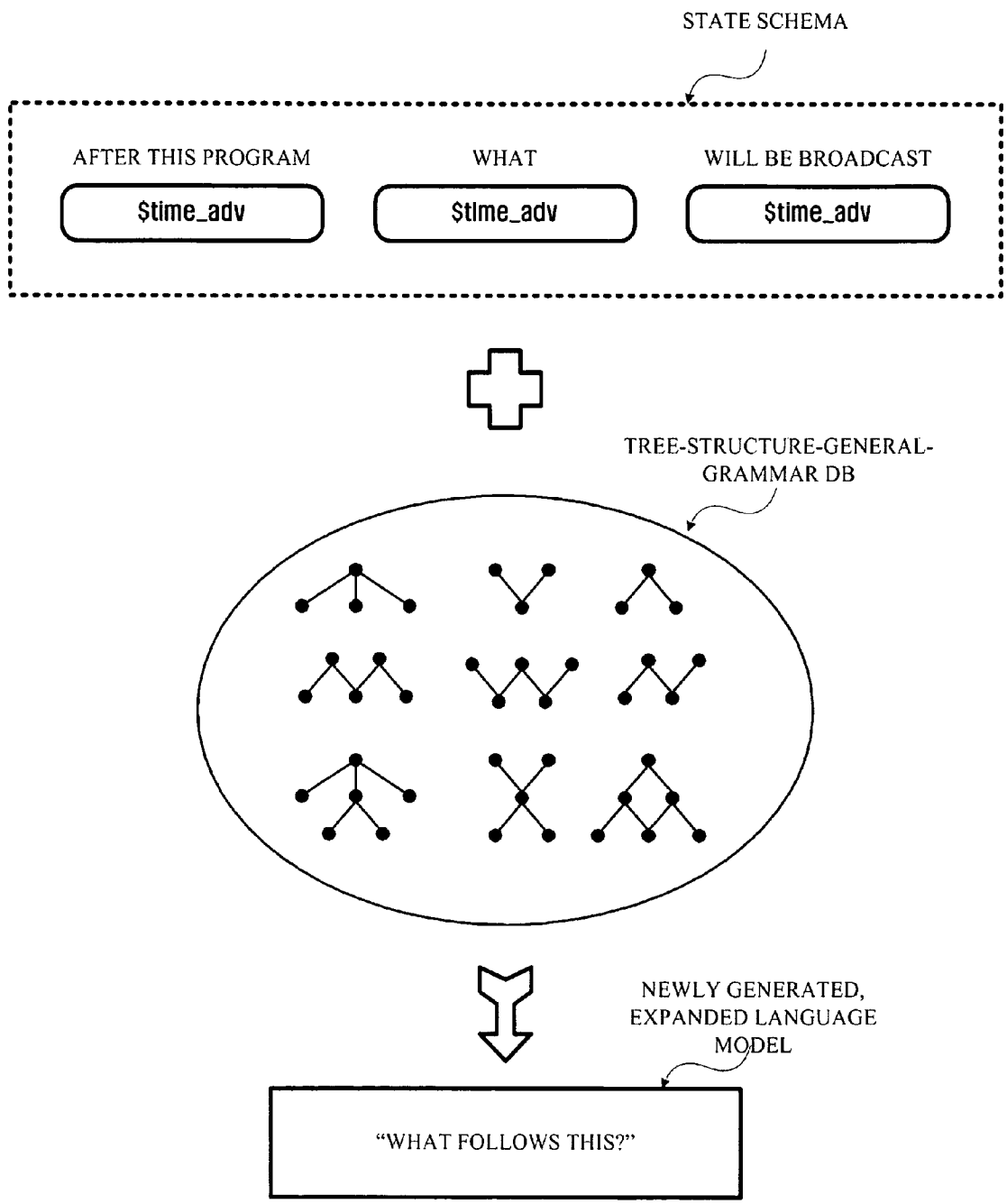
FIG. 2 is a view showing the concept of a language model establishment according to an exemplary embodiment of the present invention.
Figure 3:
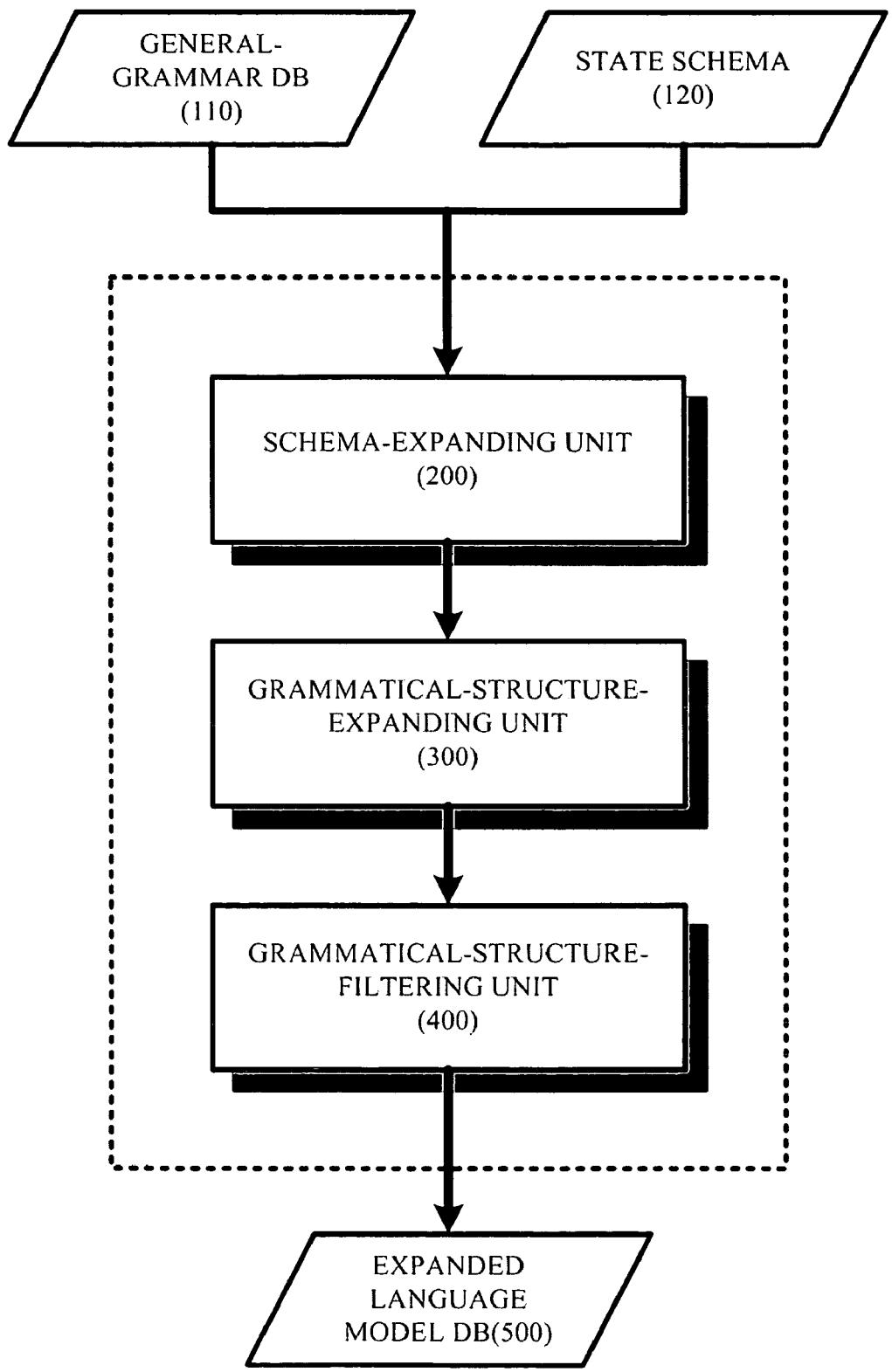
FIG. 3 is a view showing the overall structure of a language-model-establishing device according to an exemplary embodiment of the present invention.

FIG. 2 shows the concept of a language model establishment according to an exemplary embodiment of the present invention. The language model establishment concept will be explained with reference to FIG. 2. If a sentence "What will be broadcast after this program?" is stored in the language model database, a speech recognizer can recognize only the same and similar sentences. If a person says "What follows this?" while viewing a TV drama, the speech recognizer cannot recognize the spoken sentence even though this sentence has the same meaning. If a state schema dividing the above sentence ("What will be broadcast after this program?") into domain-based states is expanded using a general grammar database having a tree structure as illustrated in FIG. 2, sentences having the same meaning and a different grammatical structure (for example, "What follows this?") can also be established in a database. FIG. 3 shows the structure of a device for performing such language model establishment. A language model is a kind of grammar in a speech recognition system. Even a continuous-speech-recognition system cannot recognize all sentences spoken by a speaker. The system recognizes only sentences that comply with certain grammatical rules. Therefore, if a language model is used in the word- or sentence-searching process, it will be possible to reduce the search time of the speech recognition system and to improve both the probability of a grammatically correct sentence and the speech-recognition rate.

FIG. 3 is a view showing the overall structure of a language-model-establishing device according to an exemplary embodiment of the present invention. Referring to FIG. 3, the language-model-establishing device includes a schema-expanding unit 200 for expanding a state schema 120 using a general grammar database 110, a grammatical-structure-expanding unit 300 for expanding grammatical structures, a grammatical-structure-filtering unit 400 for filtering out grammatically incorrect sentences, and an expanded language-model database 500 generated as a result of the filtering.

The schema-expanding unit 200 expands a state schema using the general grammar database 110. The state schema is composed of at least one state defined by a finite state grammar as a sentence component. The general grammar database 110 has tree-structure data which includes data concerning structures of parts (phrases or clauses) of speech, words included in the structures, and parts (nouns, pronouns, verbs, adjectives, adverbs, prepositions or conjunctions) corresponding to the words. The tree-structure database is shown in FIG. 2.

Figure 4:
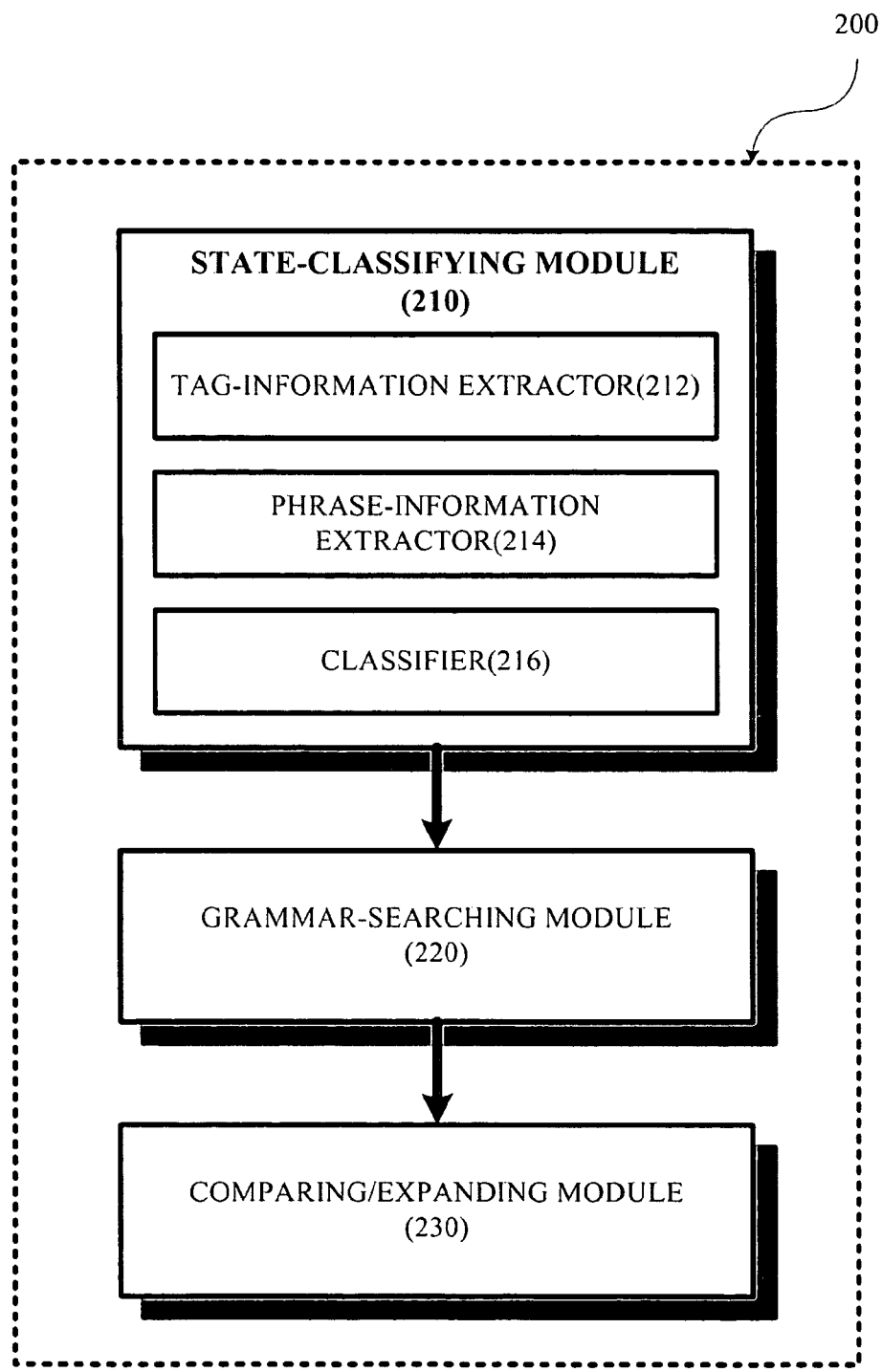
FIG. 4 is a view showing the structure of a schema-expanding unit of the language-model-establishing device in FIG. 3.

The schema-expanding unit 200 includes a plurality of modules. FIG. 4 shows the structure of the schema-expanding unit 200 of the language-model-establishing device in FIG. 3. Referring to FIG. 4, the schema-expanding unit 200 consists of a state classifying module 210 which includes a tag information extractor 212, a phrase information extractor 214 and a classifier 216, a grammar searching module 220 and a comparing/expanding module 230.

The state classifying module 210 classifies at least one state included in a sentence into a head state or a dependent state. The head state is a state which can deliver a main meaning to the finite state grammar. A predicate, such as a verb, in a sentence can be the head state. The dependent state is any state excluding the head state. Any sentence component modifying a head state can be the dependent state.

The state classifying module 210 includes three construction modules that implement functions necessary for the state classification. The tag information extractor 212 extracts tag information, including state information, from the states included in a sentence. The phrase information extractor 214 extracts phrases that can be expressed by the states only or by the connection between the states from the tag information extracted by the tag information extractor 212. The classifier 216 classifies each state included in the sentence into the head or dependent state using the phrase information extracted by the phrase information extractor 214. The head state and the dependent state have different roles in a sentence. The state classification is necessary to expand the head state delivering a main meaning.

A state classified into the head state can be present in a root node of the tree structure. The grammar searching module 220 in FIG. 4 searches the general grammar database 110 to detect tree structure data having the head state in the root node.

The comparing/expanding module 230 compares the number of sentence components in the tree structure data detected by the grammar searching module 220 with the number of dependent states added to the head state, and expands the state schema according to the comparison results. For example, if the number of sentence components is greater than that of the dependent states, the comparing/expanding module 230 will determine that the same meaning can be expressed with more sentences and thus can insert states corresponding to the sentence components in the detected tree structure data into the dependent states. If the number of sentence components is smaller than that of the dependent states, the comparing/expanding module 230 will determine that the same meaning can be expressed with less states, and thus will delete states unused in the tree structure data from the dependent states. If the number of sentence components is the same as that of the dependent states, the comparing/expanding module 230 will not insert or delete states. If there is a difference only in word order between the tree structure data and the dependent states, the comparing/expanding module 230 will rearrange the dependent states based on the word order of the tree structure data which is established according to the degree of word order freedom of the corresponding language.

Figure 5A:
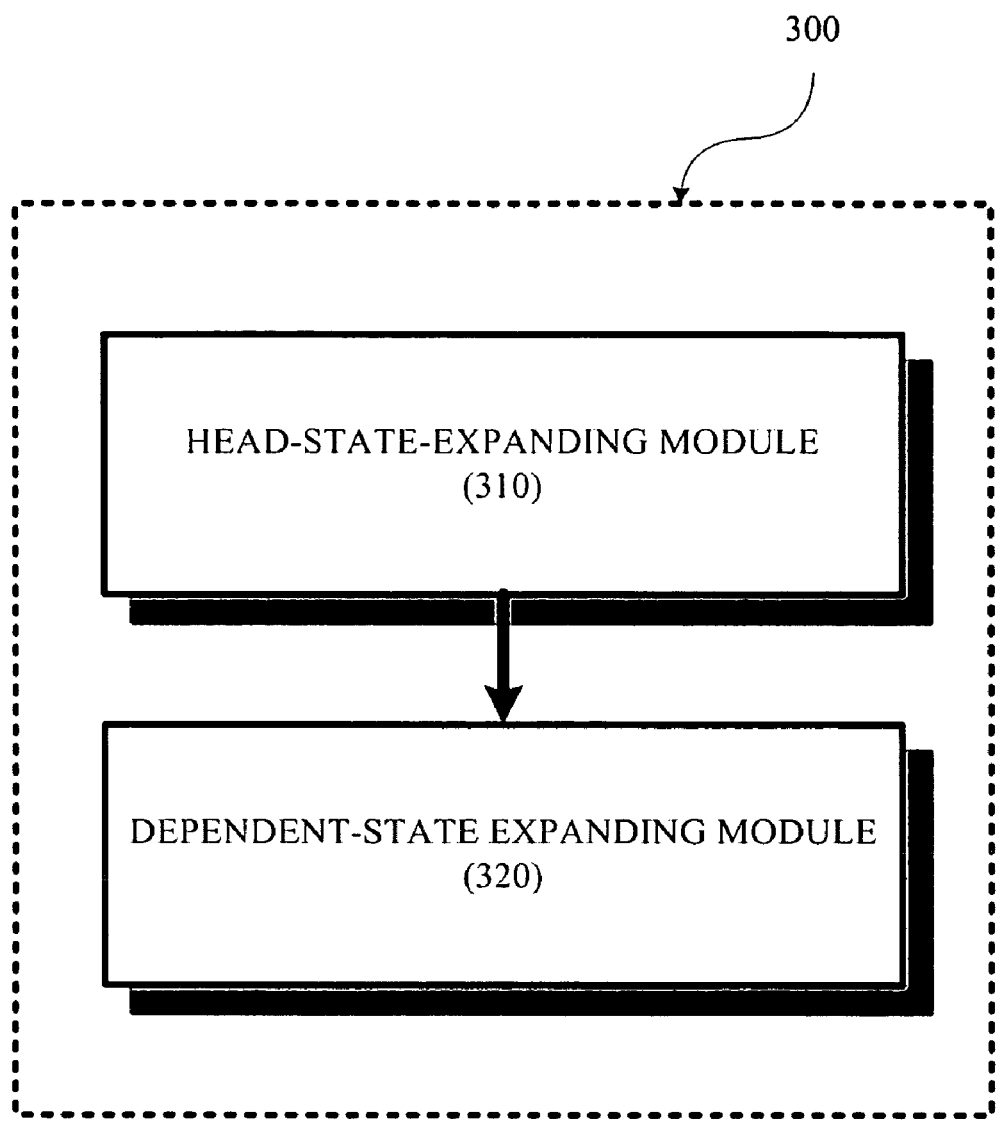
FIG. 5A is a view showing the structure of a grammatical-structure-expanding unit of the language-model-establishing device of FIG. 3.

When the state schema is expanded, the grammatical-structure-expanding unit 300 then diversely expands the grammatical structures that can be formed by a connection between the states. The module construction of the grammatical-structure-expanding unit 300 will be explained. FIG. 5A is a view showing the construction of the grammatical-structure-expanding unit 300 of the language-model-establishing device in FIG. 3.

The grammatical-structure-expanding unit 300 diversely expands the grammatical structures that can be formed by each state in the state schema expanded by the schema-expanding unit 200 using the general grammar database 110. Referring to FIG. 5A, the grammatical-structure-expanding unit 300 consists of a head-state-expanding module 310 and a dependent state expanding module 320. The head-state-expanding module 310 expands a grammatical structure that can be expressed by a head state included in the state schema using the general grammar database 110. The dependent state expanding module 320 expands a grammatical structure that can be expressed by a dependent state modifying the expanded head state using the general grammar database 110.

It is necessary to expand the grammatical structure that can be expressed by the head state because the head state and the dependent state can express different grammatical structures and because the head state in the whole schema delivers a main meaning.

Figure 5D:
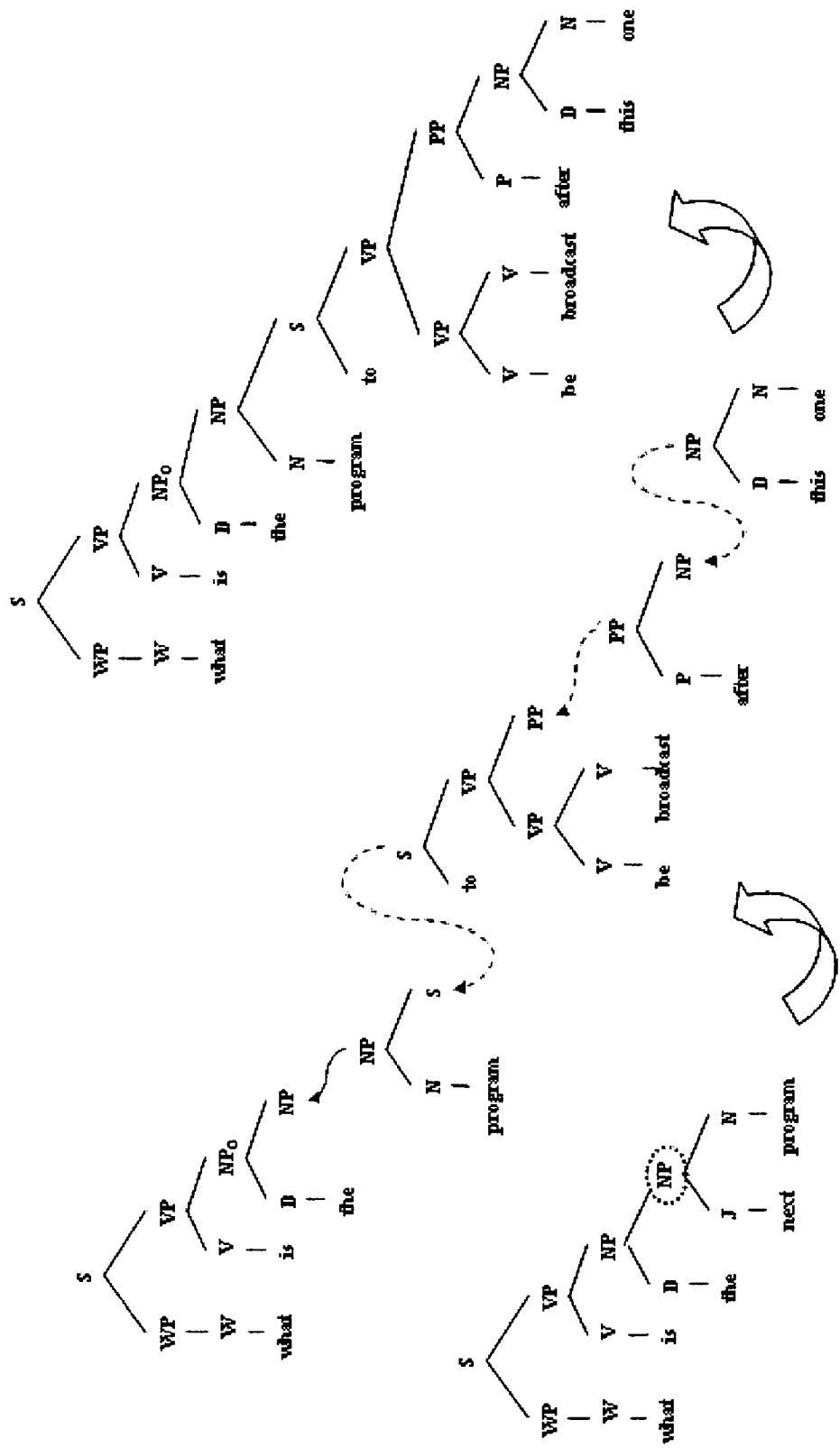
FIG. 5D is a view showing expansion of grammatical structures in the grammatical-structure-expanding unit of FIG. 5A.

FIGS. 5b, 5c and 5d are views showing how to expand grammatical structures. FIG. 5B shows substitution performed by the grammatical-structure-expanding unit 300 in FIG. 5A. FIG. 5C shows adjunction performed by the grammatical-structure-expanding unit 300. FIG. 5D shows expansion of a grammatical structure using substitution and adjunction.

Referring to FIG. 5B, substitution is a process of replacing a lower node of the head or dependent state with tree structure data corresponding to the state's part of speech. As illustrated at the upper part of FIG. 5B, an N2 node which is tree structure data can be substituted for an N1 node. For example, a sentence "Turn on MBC" is composed of a noun "MBC" and a verb phrase "turn on." The verb phrase "turn on" is the head state which delivers a main meaning according to the finite state grammar. The noun "MBC" which is an object in the sentence is composed of one word. The noun "MBC" can be substituted by a noun phrase "Channel 11 (Eleven)" which is composed of two words. In other words, the noun phrase state "MBC" can be substituted by the noun phrase tree structure data "Channel 11." The two drawings at the lower part of FIG. 5B explain the substitution in Korean and English sentences, respectively. Therefore, explanation of the substitution in a Korean sentence will be omitted.

Referring to FIG. 5C, adjunction is a process of inserting or adding tree structure data to a state schema having a head state and a dependent state. As illustrated at the upper part of FIG. 5C, an N2 node is inserted into an N1 node. Also, the N1 node is combined with an N3 node which is a lower node subordinate to the N2 node. For example, the sentence "Turn on Channel 11" is composed of the verb phrase "turn on" and the noun phrase "channel 11." The verb phrase "turn on" is the head state which delivers a main meaning according to the finite state grammar. The verb phrase "turn on" is composed of two words. Generally, a verb phrase can be combined with an adverb modifying the verb phrase. The combination of a verb phrase and an adverb (or adverb phrase) can be searched in the general grammar database 110. The verb phrase "turn on" can be changed to a new verb phrase "please turn on" which is formed by addition of an adverb to the verb phrase. In other words, a new sentence "Please turn on Channel 11" is generated using the sentence "Turn on Channel 11." The two drawings at the lower part of FIG. 5C explain the adjunction in Korean and English sentences, respectively. Therefore, explanation of the substitution in a Korean sentence will be omitted.

FIG. 5D shows expansion of a grammatical structure through substitution and adjunction processes. Referring to FIG. 5D, an interrogative sentence "What is the next program?" can be expanded by adding certain parts of speech. Through the processes of substitution and adjunction, sentences having the same meaning and a different grammatical structure (for example, "What is the program to be broadcast after this one?") can be generated.

Figure 6A:
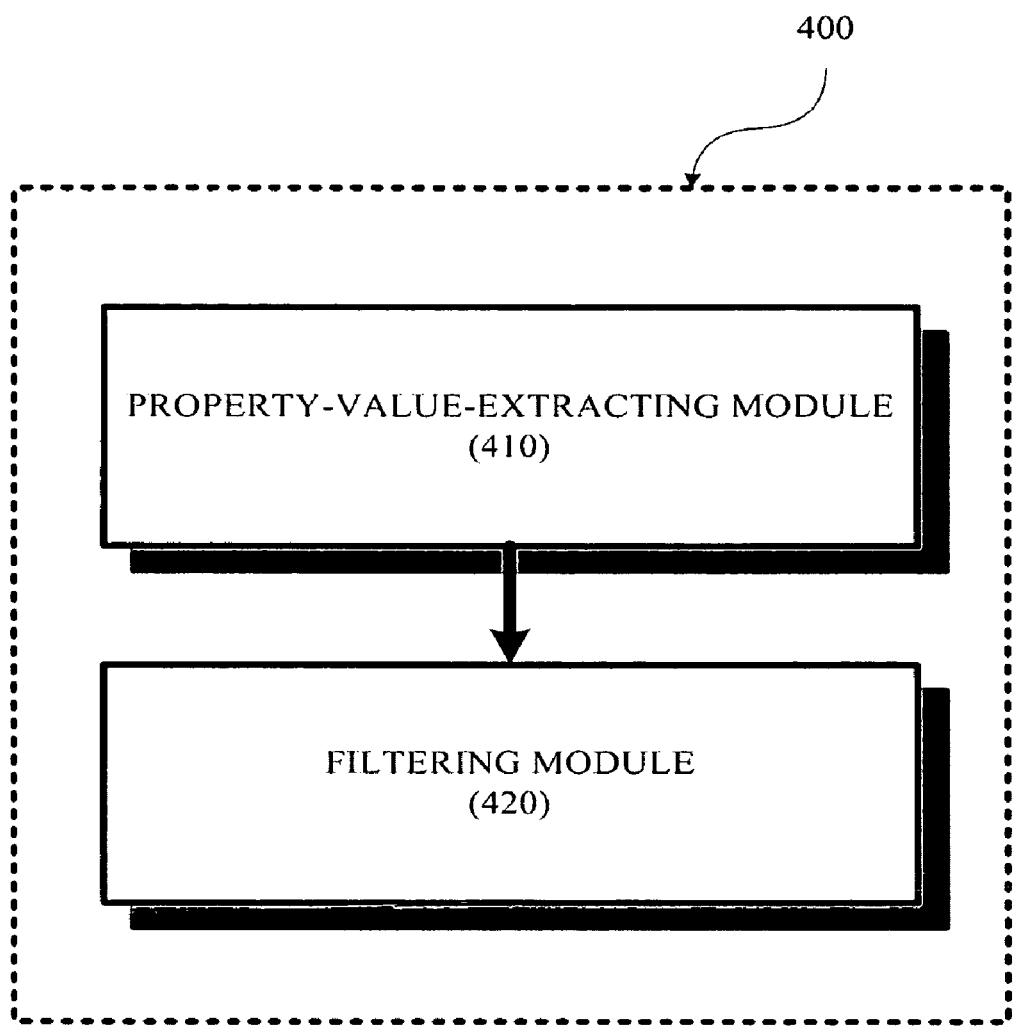
FIG. 6A is a view showing the structure of a grammatical-structure-filtering unit of the language-model-establishing device in FIG. 3.

FIG. 6A is a view showing the construction of the grammatical-structure-filtering unit 400 of the language-model-establishing device in FIG. 3. The grammatical-structure-filtering unit 400 filters out any incorrect grammatical structure from the grammatical structures expanded by the grammatical-structure-expanding unit 300 using the general grammar database 110.

Referring to FIG. 6A, the grammatical-structure-filtering unit 400 includes a property value comparing module 410 and a filtering module 420. The property value comparing module 410 compares the property values of a first conjunction node and a second conjunction node of a conjunction state generated through the processes of substitution and adjunction. When the two property values of the first and second conjunction nodes are identical, the filtering module 420 assigns the identical value as a property value of the conjunction state and stores the conjunction state in the general grammar database 110. When the property value of the first conjunction node is different from that of the second conjunction node, the filtering module 420 recognizes that there was a failure in the substitution and adjunction processes. Accordingly, the filtering module 420 does not store the conjunction state in the general grammar database 110. The first conjunction node or the second conjunction node may have two or more property values. In such a case, the filtering module 420 assigns an intersection of the property values of the first and second conjunction nodes as a property value of the conjunction state.

The filtering process will be explained in detail. FIG. 6B is a view showing the filtering process performed in the grammatical-structure-filtering unit 400 in FIG. 6A. As illustrated at the upper part of FIG. 6B, an N2 node is added to an N1 node in order to generate a new conjunction node Nu. To effectuate the Nu node, the node addition should be approved through the filtering process. Referring to the lower drawing of FIG. 6B, an adverb phrase "from Channel 11" or "to Channel 11" can be added to the verb "turn." The adverb phrase "from Channel 11" means a source (currently selected), while "to Channel 11" means a target (to be selected). "Channel 11" commonly used in the two adverb phrases does not influence the filtering process. Whether the "case" indicating a sentence component is a "source" or a "target" will influence the filtering process. Since the property value of the adverb phrase "to Channel 11" is identical to that of a node (NP1), the adverb phrase "to Channel 11" will be added to the node NP1, thereby generating a sentence "Turn to Channel 11."

Figure 8B:
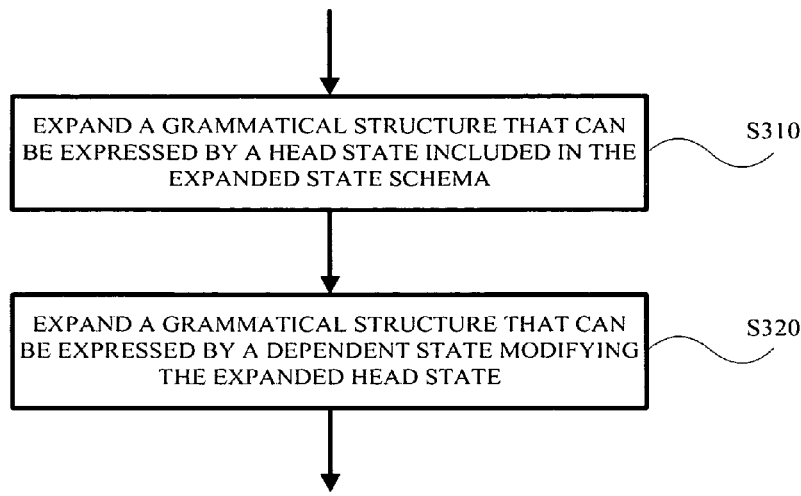
FIG. 8B is a flowchart showing sub-steps of expanding grammatical structures in the process of FIG. 7.
Figure 8C:
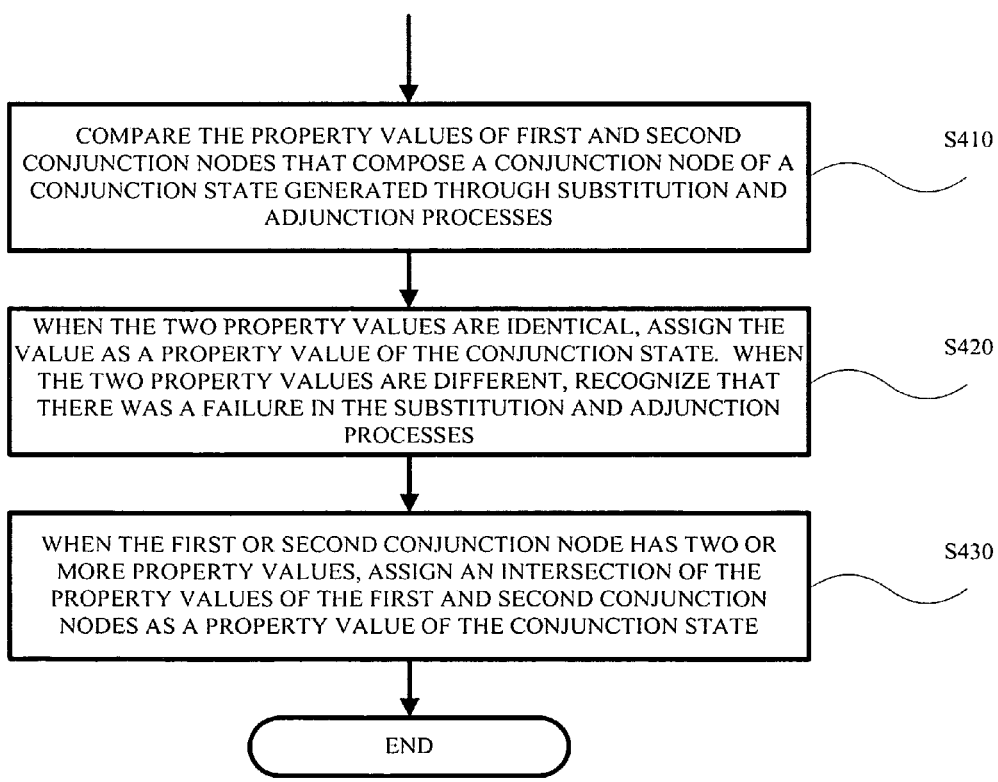
FIG. 8C is a flowchart showing sub-steps of filtering in the process of FIG. 7.

Hereinafter, a process of establishing a language model will be explained in detail with reference to FIGS. 7 and 8A to 8C. FIG. 7 is a flowchart showing a process of establishing a language model according to an exemplary embodiment of the present invention. FIG. 8A is a flowchart showing sub-steps of expanding a state schema in the process of FIG. 7. FIG. 8B is a flowchart showing sub-steps of expanding grammatical structures in the process of FIG. 7. FIG. 8C is a flowchart showing sub-steps of filtering in the process of FIG. 7.

Referring to FIG. 7, a state schema composed of at least one state defined by a finite state grammar is expanded using the general grammar database (S200). The general grammar database 110 has tree-structure data which includes data concerning structures and meanings of parts (phrases or clauses) of speech, words included in the structures, and parts (nouns, pronouns, verbs, adjectives, adverbs, prepositions or conjunctions) corresponding to the words. The process of expanding a state schema will now be explained with reference to FIG. 8A.

First, tag information including state information is extracted from one or more states composing the state schema (S210). Then, information on phrases that can be expressed by the states only or by the connection between the states is extracted from the tag information (S220). Each state composing the state schema is classified into a head state or a dependent state using the extracted phrase information (S230). The head state is a state which can deliver a main meaning to the finite state grammar. A predicate, such as a verb, in a sentence can be the head state. The dependent state is any state excluding the head state. Any sentence component modifying a head state (for example, a noun phrase or an adjective phrase) can be the dependent state.

When each state is classified into the head or dependent state, tree structure data having a state identical to the head state in a root node is searched for in the general grammar database 110 (S240). Upon detection of the tree structure data, the number of sentence components in the tree structure data is compared with the number of dependent states added to the head state (S250). The state schema is expanded according to the comparison results. To be specific, if the number N1 of sentence components in the tree structure data is greater than the number N2 of the dependent states, it will be recognized that the same meaning can be expressed with more sentences. Accordingly, states corresponding to the sentence components in the detected tree structure data can be inserted into the dependent states (S251). If the number N1 of sentence components is smaller than the number N2 of the dependent states, it will be recognized that the same meaning can be expressed with less states. In this case, states unused in the tree structure data can be deleted from the dependent states (S253). If the number N1 of sentence components is identical to the number N2 of the dependent states, no insertion or deletion of states will be made. If there is a difference only in word order between the tree structure data and the dependent states, the dependent states will be rearranged based on the word order of the tree structure data which is established according to the degree of word order freedom of the corresponding language (S252).

The next process of expanding a grammatical structure that can be expressed by each state composing the expanded state schema will be explained in detail with reference to FIG. 8B. First, a grammatical structure that can be expressed by the head state included in the expanded state schema is expanded using the general grammar database 110 (S310). Then, a grammatical structure that can be expressed by the dependent state modifying the expanded head state is expanded using the general grammar database 110 (S320). The expansion of states means implementation of both the substitution process for substituting the head or dependent state by tree structure data corresponding to the same part of speech and the adjunction process for adding the tree structure data between the states. Since the substitution and adjunction processes were explained above with reference to FIGS. 5B and 5C, no further explanation will be made.

As the final process, any incorrect grammatical structure is filtered out from the expanded grammatical structures using the general grammar database 110 (S400). In this process, property values of a first conjunction node and a second conjunction node which compose a conjunction node of a conjunction state generated through the processes of substitution and adjunction are compared with each other (S410). When the two property values of the first and second conjunction nodes are identical, the identical value is assigned as a property value of the conjunction state. When the property value of the first conjunction node is different from that of the second conjunction node, it is recognized that there was a failure in the substitution and adjunction processes. Accordingly, in the latter case, the conjunction state is not stored in the general grammar database 110 (S420). If the first conjunction node or the second conjunction node has two or more property values, only an intersection of the property values of the first and second conjunction nodes is assigned as a property value of the conjunction state (S430).

In addition to the above-described exemplary embodiments, exemplary embodiments of the present invention can also be implemented by executing computer readable code/instructions in/on a medium/media, e.g., a computer readable medium/media. The medium/media can correspond to any medium/media permitting the storing and/or transmission of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter.

The computer readable code/instructions can be recorded/transferred in/on a medium/media in a variety of ways, with examples of the medium/media including magnetic storage media (e.g., floppy disks, hard disks, magnetic tapes, etc.), optical media (e.g., CD-ROMs, or DVDs), magneto-optical media (e.g., floptical disks), hardware storage devices (e.g., read only memory media, random access memory media, flash memories, etc.) and storage media, which may include computer readable code/instructions, data files, data structures, etc. The medium may also be a distributed network, so that the computer readable code/instructions are stored/transferred and executed in a distributed fashion. The computer readable code/instructions may be executed by one or more processors. The computer readable code/instructions may also be executed and/or embodied in at least one application specific integrated circuit (ASIC).

In addition, hardware devices may be configured to act as one or more software modules in order to perform the operations of the above-described exemplary embodiments.

In connection with the above description, a "module" means, but is not limited to, a software or hardware component, such as Field Programmable Gate Array (FPGA) or an Application-Specific Integrated Circuit (ASIC), which performs certain functions or tasks. A module may be configured to reside on an addressable storage medium or to execute one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Additionally, the components and modules may advantageously be implemented to execute on one or more computing devices.

The device, method, and medium for establishing a language model according to the present invention can expand a state schema defined by a finite state grammar using a general grammar database and thereby improve recognition of unlearned grammatical structures.

The advantageous effects of the present invention are not limited to those described above. Additional effects should be obvious to those skilled in the art in view of the accompanying claims.

Although a few exemplary embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A device for establishing a language model, comprising:
   a schema-expander to expand a state schema which is composed of one or more states defined by a finite state grammar using a general grammar database;
   a grammatical-structure-expander to expand grammatical structures which can be expressed by each state of the expanded state schema using the general grammar database;
   a grammatical-structure-filter to filter out any incorrect grammatical structure from the expanded grammatical structures using the general grammar database,
   wherein the grammatical-structure-filter includes a property value comparing module to compare property values of a first conjunction node and a second conjunction node that compose a conjunction node of a conjunction state generated through substitution and adjunction; and
   a filtering module to assign only an intersection of the property values of the first and second conjunction nodes as a property value of the conjunction state, and to store the conjunction state in the general grammar database if the first conjunction node or the second conjunction node has two or more property values.

2. The device of claim 1, wherein the head state is a predicate.

3. The device of claim 1, wherein the general grammar database has tree structure data that includes data concerning structures and meanings of phrases or clauses, words included in the structures, and parts of speech corresponding to the words.

4. The device of claim 3, wherein the schema-expander includes:
   a state classifying module to classify each state into the head state having a main meaning in a sentence or the dependent state which is any state excluding the head state;
   a grammar searching module to search the general grammar database to detect tree structure data having a state identical to the classified head state in a root node; and
   a comparing/expanding module to compare the number of sentence components in the detected tree structure data with the number of dependent states added to the head state and to expand the state schema according to the comparison results.

5. The device of claim 4, wherein the state classifying module includes:
   a tag-information extractor to extract tag information including state information from the states;
   a phrase-information extractor to extract phrases that can be expressed by the states only or by the connection between the states from the extracted tag information; and
   a classifier to classify each state into the head or dependent state using the phrase information extracted by the phrase information extractor.

6. The device of claim 4, wherein the comparing/expanding module:
   inserts states corresponding to the sentence components in the detected tree structure data into the dependent states if the number of the sentence components is greater than that of the dependent states; and
   deletes states unused in the tree structure data from the dependent states if the number of sentence components is smaller than that of the dependent states.

7. The device of claim 6, wherein the grammatical-structure-expander includes:
   a head-state-expanding module to expand a grammatical structure that can be expressed by a head state included in the expanded state schema using the general grammar database; and
   a dependent state expanding module to expand a grammatical structure that can be expressed by a dependent state modifying the expanded head state using the general grammar database.

8. The device of claim 7, wherein the expansion includes a substitution process for substituting the head or dependent state by tree structure data corresponding to the same part of speech and an adjunction process for adding the tree structure data between the states.

9. The device of claim 8, wherein the grammatical-structure-filter further includes:
   a filtering module to determine whether the two property values of the first and second conjunction nodes are identical, to assign the identical value as a property value of the conjunction state and store the conjunction state in the general grammar database if the two property values are identical, and to recognize that there was a failure in the substitution and adjunction processes and not store the conjunction state in the general grammar database if the property value of the first conjunction node is different from that of the second conjunction node.

10. A method of establishing a language model, comprising:
   (a) expanding a state schema which is composed of at least one state defined by a finite state grammar using a general grammar database;
   (b) expanding grammatical structures which can be expressed by each state of the expanded state schema using the general grammar database; and
   (c) filtering out any incorrect grammatical structure from the expanded grammatical structures using the general grammar database,
   wherein (c) includes (c1) comparing property values of a first conjunction node and a second conjunction node that compose a conjunction node of a conjunction state generated through substitution and adjunction and (c2) assigning only an intersection of the property values of the first and second conjunction nodes as a property value of the conjunction state, and storing the conjunction state in the general grammar database if the first conjunction node or the second conjunction node has two or more property values.

11. The method of claim 10, wherein the general grammar database has tree structure data that includes data concerning structures and meanings of phrases or clauses, words included in the structures, and parts of speech corresponding to the words.

12. The method of claim 11, wherein (a) includes:
   (a1) classifying each state into the head state having a main meaning in a sentence or the dependent state which is any state excluding the head state;
   (a2) searching the general grammar database to detect tree structure data having a state identical to the classified head state in a root node; and
   (a3) comparing the number of sentence components in the detected tree structure data with the number of dependent states added to the head state and expanding the state schema according to the comparison results.

13. The method of claim 12, wherein (a1) includes:
   extracting tag information including state information from the states;
   extracting phrases that can be expressed by the states only or by the connection between the states from the extracted tag information; and
   classifying each state into the head or dependent state using the phrase information extracted by the phrase information extractor.

14. The method of claim 12, wherein (a3) includes:
   inserting states corresponding to the sentence components in the detected tree structure data into the dependent states if the number of the sentence components is greater than that of the dependent states; and
   deleting states unused in the tree structure data from the dependent states if the number of sentence components is smaller than that of the dependent states.

15. The method of claim 14, wherein (b) includes:
   (b1) expanding a grammatical structure that can be expressed by a head state included in the expanded state schema using the general grammar database; and
   (b2) expanding a grammatical structure that can be expressed by a dependent state modifying the expanded head state using the general grammar database.

16. The method of claim 15, wherein the expansion includes a substitution process for substituting the head or dependent state by tree structure data corresponding to the same part of speech and an adjunction process for adding the tree structure data between the states.

17. The method of claim 16, wherein (c) further includes:
   (c2) determining whether the two property values of the first and second conjunction nodes are identical, assigning the identical value as a property value of the conjunction state and storing the conjunction state in the general grammar database if the two property values are identical, and recognizing that there was a failure in the substitution and adjunction processes and not storing the conjunction state in the general grammar database if the property value of the first conjunction node is different from that of the second conjunction node.

18. At least one computer readable medium storing instructions that control at least one processor to perform a method comprising:
   (a) expanding a state schema which is composed of at least one state defined by a finite state grammar using a general grammar database;
   (b) expanding grammatical structures which can be expressed by each state of the expanded state schema using the general grammar database; and
   (c) filtering out any incorrect grammatical structure from the expanded grammatical structures using the general grammar database,
   wherein (c) includes (c1) comparing property values of a first conjunction node and a second conjunction node that compose a conjunction node of a conjunction state generated through the processes of substitution and adjunction and (c2) assigning only an intersection of the property values of the first and second conjunction nodes as a property value of the conjunction state, and storing the conjunction state in the general grammar database if the first conjunction node or the second conjunction node has two or more property values.

19. At least one computer readable medium as recited in claim 18, wherein the general grammar database has tree structure data that includes data concerning structures and meanings of phrases or clauses, words included in the structures, and parts of speech corresponding to the words.

20. At least one computer readable medium as recited in claim 19, wherein (a) includes:

(a1) classifying each state into the head state having a main meaning in a sentence or the dependent state which is any state excluding the head state;

(a2) searching the general grammar database to detect tree structure data having a state identical to the classified head state in a root node; and (a3) comparing the number of sentence components in the detected tree structure data with the number of dependent states added to the head state and expanding the state schema according to the comparison results.

21. At least one computer readable medium as recited in claim 20, wherein (a1) includes:

extracting tag information including state information from the states;

extracting phrases that can be expressed by the states only or by the connection between the states from the extracted tag information; and classifying each state into the head or dependent state using the phrase information extracted by the phrase information extractor.

22. At least one computer readable medium as recited in claim 20, wherein (a3) includes:

inserting states corresponding to the sentence components in the detected tree structure data into the dependent states if the number of the sentence components is greater than that of the dependent states; and deleting states unused in the tree structure data from the dependent states if the number of sentence components is smaller than that of the dependent states.

23. At least one computer readable medium as recited in claim 22, wherein (b) includes:

(b1) expanding a grammatical structure that can be expressed by a head state included in the expanded state schema using the general grammar database; and (b2) expanding a grammatical structure that can be expressed by a dependent state modifying the expanded head state using the general grammar database.

24. At least one computer readable medium as recited in claim 23, wherein the expansion includes a substitution process for substituting the head or dependent state by tree structure data corresponding to the same part of speech and an adjunction process for adding the tree structure data between the states.

25. At least one computer readable medium as recited in claim 24, wherein (c) further includes:

(c2) determining whether the two property values of the first and second conjunction nodes are identical, assigning the identical value as a property value of the conjunction state and storing the conjunction state in the general grammar database if the two property values are identical, and recognizing that there was a failure in the substitution and adjunction processes and not storing the conjunction state in the general grammar database if the property value of the first conjunction node is different from that of the second conjunction node.

\* \* \* \* \*